No. 678,779. Patented July 16, 1901.
J. A. GUINN.
BALL BEARING.
(Application filed Sept. 5, 1900.)
(No Model.)
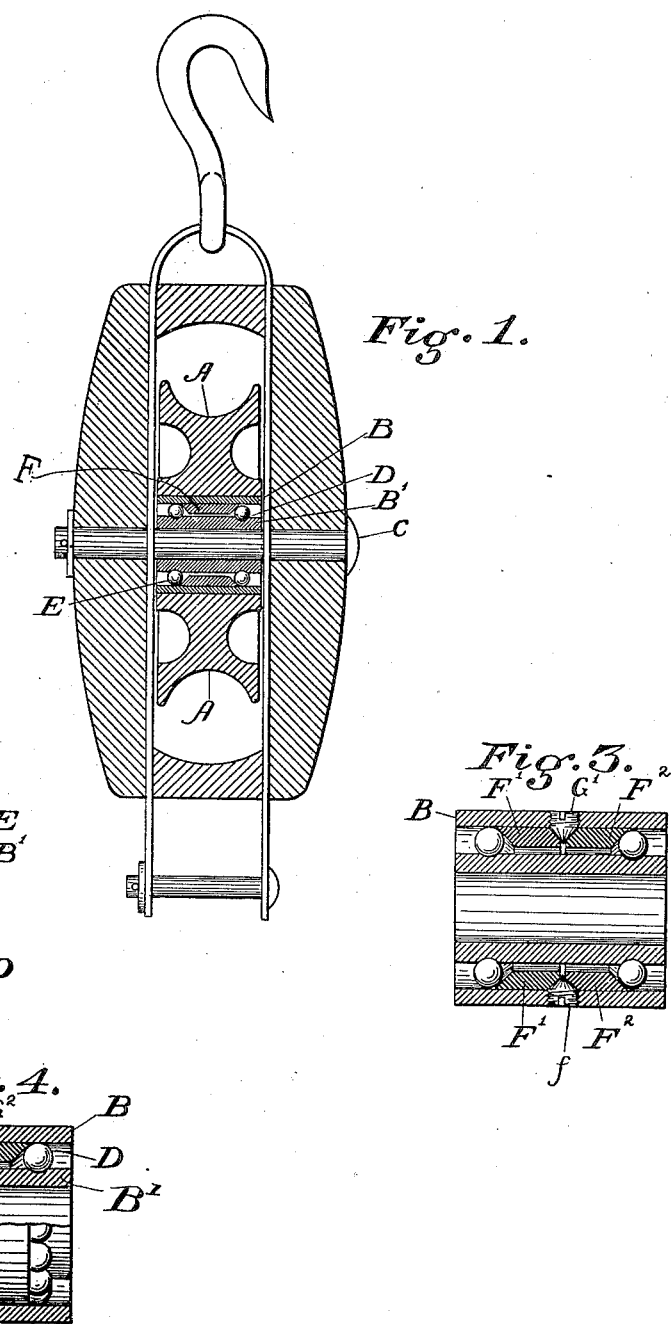

UNITED STATES PATENT OFFICE.

JOHN A. GUINN, OF BALTIMORE, MARYLAND, ASSIGNOR TO FREDERICK HOOKER, OF SAME PLACE.

BALL-BEARING.

SPECIFICATION forming part of Letters Patent No. 678,779, dated July 16, 1901.

Application filed September 5, 1900. Serial No. 29,030. (No model.)

*To all whom it may concern:*

Be it known that I, JOHN A. GUINN, a citizen of the United States, residing at Baltimore, State of Maryland, have invented certain new and useful Improvements in Ball-Bearings, of which the following is a specification.

My invention is an improvement in ball-bearings, and has for its object to provide a device of this character which will be easy to assemble and very durable in construction.

The invention consists in certain constructions, arrangements, and combinations of the parts, which will be hereinafter fully described and claimed.

Reference is to be had to the accompanying drawings, forming part of this specification, in which—

Figure 1 is a vertical sectional view of a pulley embodying one form of my invention. Fig. 2 is an enlarged detail sectional view of the bearing illustrated in Fig. 1. Figs. 3 and 4 are sectional views of slightly-modified forms of bearings.

Referring to Fig. 1, A designates a pulley, in which is tightly secured an annular outer bearing B, and B' is the inner uniformly-cylindrical bearing, adapted to receive the shaft or spindle C of the pulley and provided with ball-races D. Rows of antifriction-balls E are located in the races D and support the outer bearing B, so that the latter may freely turn.

F designates a bushing, which, as best shown in Fig. 2, is fitted tightly with frictional engagement in the outer bearing B between the rows of balls and is spaced from or out of contact with the inner bearing B'. The bushing F is separate or distinct from the bearings B and B' and is designed to separate the balls and to maintain the rotation of the parts in a practically fixed plane, and to this end it is formed with beveled edges G, which bear against the balls and prevent side motion.

To assemble the parts of the bearing, the bushing F and inner bearing B' are caused to protrude out of one end of the outer bearing B, one row of balls is dropped into place, the bushing F and inner bearing B' are then driven out of the other end of the outer bearing, the other row of balls is dropped into place, and the bushing F and inner bearing B' are finally driven back to a central position, as shown in Fig. 2, the bushing F fitting tightly in the outer bearing.

As illustrated in Fig. 3, the bushing, which is located between the rows of balls, is made in two sections $F'$ $F^2$, whose adjacent edges are oppositely inclined and form a seat $f$ for wedging screws $G'$, which work in threaded openings in the outer bearing B. The parts in this form of bearing are assembled in the same manner as that described for Figs. 1 and 2, and after the parts are in place the screws $G'$ are inserted and bear upon the seat $f$, the wedging action of the screws forcing the two sections of the bushing apart, and thus adjusting the bearing to the desired point.

Fig. 4 illustrates another slightly-modified form of bearing, in which the bushing $F^3$ between the balls is formed in one piece and is provided with a seat $f'$, which may be a circular depression or extend annularly around the bushing, as shown. $G^2$ designates a screw or pin, of which there may be any desired number, working in a threaded opening in the outer bearing B and fitted in the seat $f'$, so as to preclude the possibility of any sidewise movement of the bushing.

Having thus described my invention, what I claim as new, and desire to secure by Letters Patent, is—

1. In a device of the character described, the combination of an outer bearing; an inner uniformly-cylindrical bearing formed with ball-races; rows of antifriction-balls in said races and supporting the outer bearing to rotate about the inner bearing; and a distinct or separate bushing tightly fitting with frictional engagement in the outer bearing between the rows of balls, and bearing against said balls and out of contact with said inner bearing, as set forth.

2. The combination of the outer and inner bearings; rows of antifriction-balls interposed between said bearings; a separate or distinct bushing fitting with frictional engagement in said outer bearing between the rows of balls and arranged to bear against said balls, said bushing being provided with a seat for a pin or screw; and a pin or screw working through the outer bearing into said seat, as set forth.

In testimony whereof I affix my signature in the presence of two witnesses.

JOHN A. GUINN.

Witnesses:
F. S. STITT,
CHARLES B. MANN, Jr.